United States Patent [19]

Foerst

[11] 4,077,138
[45] Mar. 7, 1978

[54] DRIVING SIMULATOR

[76] Inventor: Reiner Foerst, Bickenbachstr 57, 5270 Gummersbach 7, Germany

[21] Appl. No.: 686,113

[22] Filed: May 13, 1976

[30] Foreign Application Priority Data

May 13, 1975 Germany .......................... 2521103

[51] Int. Cl.² ............................................. G09B 9/04
[52] U.S. Cl. .................................... 35/11 R; 358/104
[58] Field of Search .................... 35/11 R, 11 A, 10.2, 35/12 N, 12 L, 12 Q, 25; 178/6.8, DIG. 30, DIG. 35; 273/1 E, 85 R, DIG. 28, 86 B; 340/324 A, 324 AD, 384 R, 384 E; 358/80, 81

[56] References Cited

U.S. PATENT DOCUMENTS

| | | | |
|---|---|---|---|
| 3,523,374 | 8/1970 | Schuster | 35/11 R |
| 3,719,817 | 3/1973 | McCoy et al. | 340/324 AD X |
| 3,831,172 | 8/1974 | Olliges et al. | 273/1 E X |
| 3,833,759 | 9/1974 | Yatabe | 35/12 N X |
| 3,862,358 | 1/1975 | Wolff | 35/11 A X |

*Primary Examiner*—William H. Grieb
*Assistant Examiner*—Vance Y. Hum
*Attorney, Agent, or Firm*—Walter Becker

[57] ABSTRACT

The devices for the simulation include
several video signal generators each of which brightening on a monitor one light spot pair representing two road border posts,
an analog deflection voltage generator for the horizontal and vertical shifting and for the width and height alteration of said light spots, using an evaluation matrice, integrators, and digitally actuated electronic switches,
an analog computing device for the computation of the speed signal, simulating a decreasing rotation-torque characteristic,
several curve function generators which generate standard curves on triggering by a digital curve sequence program generator,
a curvature function generator which generates an additional voltage proportional to the curvature of the road and used for comparison with the steering wheel angle, the difference being supplied to a horizontal shifting control device,
oscillators for the generation of noises, to which the rotation signal, the signal of excessive centrifugal acceleration, and an error signal are supplied, and
an additional video signal generator as well as an additional sequence program generator, for the generation of an obstacle.

14 Claims, 11 Drawing Figures

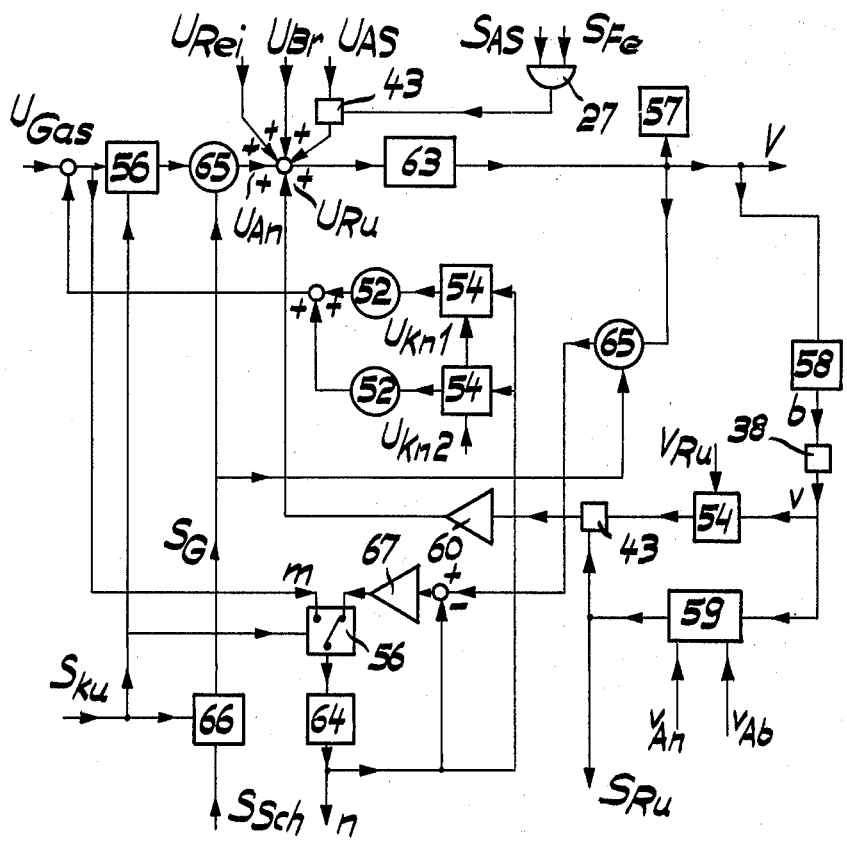
_Fig. 8_
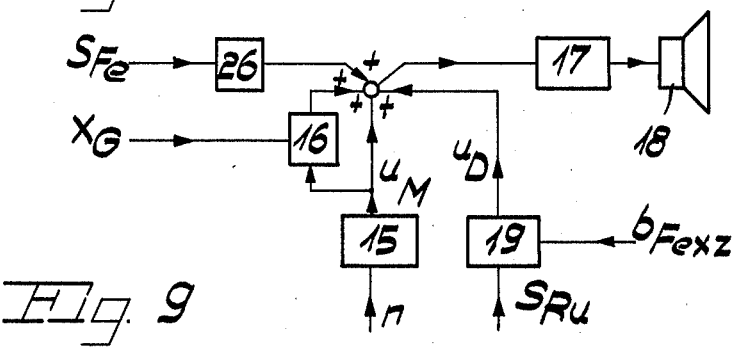
_Fig. 9_

DRIVING SIMULATOR

The invention relates to a driving simulator which is a device for the simulation of a car ride on a plane, a multicurved road laterally limited by an enclosure using a monitor for the picture of the road perspectively observed by the driver, a program for the generation of the road picture, and control devices such as accelerator pedal, brake pedal, clutch pedal, and steering wheel, all of which influence the road picture, and using sound generating devices.

For introduction, it may first be explained which processes take place during a real car ride.

The picture seen by the driver through the windshield of his car shows the car front, the road, possibly other road users, the horizon, the sky, possibly surrounding objects, and so on. The road being straight, the border lines of the road are straight lines, meeting in one point jointly with the horizon line. Thus, in the plane of the picture, the horizontal distances of the two border lines increase linearly from top to bottom. At curves, this linearity is an approximation. When the direction of the car changes relative to the direction of the road, the horizontal distances also change.

A horizontal shifting of the picture corresponds to a turn of the car relative to the direction of the road, and a turn of the picture around the horizon intersection point of the road corresponds to a parallel shifting of the car relative to the middle of the road.

In order to keep the car in the middle of the road, the curvature of the car track, given by the angle of the steering wheel, has to be kept equal to the curvature of the road. Inspite of a correct steering wheel angle, the car may encounter a track deviation if the speed is so high with the given road curvature that the permissible centrifugal acceleration is exceeded and the car is drifting. This drifting is compensated with acceleration of the car in the curve.

The speed of the car depends on engaging the associated control devices and the characteristic values of the car such as air resistance, inertia, engine power, and friction etc. The deceleration, when braking, is approximately proportional to the pressure on the brake pedal up to a definite threshold. Beyond this threshold, the wheels lock-up and a deceleration results which is smaller than the maximum deceleration with rolling wheels, and is not to be influenced by further increase of the pressure on the brake pedal. Only if the pressure falls below the critical minimum pressure, the locking is released.

The most relevant noises heard by the driver during the ride are the engine noise depending on rotation and the noise of the sliding tires when drifting in curves as well as the noise when the car is braked down with full pressure.

When designing a driving simulator, the task arises to represent part of these criteria or all of them. Furthermore, a simulator may comprise phenomena which are unknown in reality, e.g. instances causing an artificial reaction of the simulator on faulty operation by the driver which would cause an accident in reality.

One driving simulator of the mentioned kind was built already. It uses a computer program by which the movement of the road borders is computed step by step digitally dependent upon the steering wheel movement and this is displayed on a screen.

However, multi-purpose digital computers with hardware and storage required by such a simulation are very expensive and are out of the question for a widespread use of driving simulators.

Also a general proposal is made for the layout of a driving simulator pointing out the idea to generate voltages by an analog device, according to the equations of a simplified environmental picture and to compare these voltages to saw tooth voltages synchronous to the picture and line pulses of a monitor.

However, this proposal lacks ideas for the realization thereof in actuality to a great extent; fundamental considerations are missing, and if one would pursue the indicated methods, the simulator would become a very expensive analog computer.

Therefore, the objects of the invention are as follows:
(a) to point out new principles for a driving simulation which can easily be realized technically, which are economical and nevertheless effective, and which avoid the defects of known principles,
(b) to simulate physical phenomena of a real car ride, which have not been simulated before or which have not been simulated in connection with the subject of the invention,
(c) to disclose circuits integrating well known parts or functional units by which all proposals of the invention can be realized easily and economically.

For completion, it may be mentioned that driving simulators are known which give the driver the impression of an acceleration by mechanically moving the seat. Such an effect is possible by processing the signals generated in the simulation device described below.

The individual devices comprised by the simulator according to the invention are arranged as follows:
A—Devices for the generation of the road picture,
B—Devices for the generation of curves,
C—Devices for the alteration of the road picture with track deviations of the simulated car,
D—Devices for the influence on the speed,
E—Devices for the generation of noises,
F—Devices for the reaction of the simulator on faulty operation of the driver,
G—Devices for the termination of the driving distance and for the measuring of the driving time.

According to another idea of the invention additional devices are provided which simulate obstacles arranged somewhere in the middle of the road, in front of which the driver has to brake down. They are to be found in the arrangement under:
H—Devices for obstructing the ride.

To resolve the given object, an electronic circuit is described below as a signal flow circuit with reference to the functional units and signals which are used in the figures. Thus, the description explains not only the ideas of the invention but also the functional relation between the signals and the units demonstrated on the pictures.

To (A) For the generation of the road picture, the invention provides that the enclosures are represented as sequences of equidistant rectangularly shaped border posts standing vertical and lateral. The left posts are standing exactly opposite to the right posts, thus represented by pairs of rectangular light spots 3 located horizontally side by side, depicted on the screen of a monitor 1. The distance between the two light spots of one pair increases independent of curves and of possible turns of the car linearly with the light spot distance from the horizon 4, simplifying the reality. Furthermore, a representation is chosen to increase the vertical distances of the light spot pairs in a non-linear way from top to bottom according to the perspective and to proportionally increase the size of the light spots laterally as well as longitudinally with their distance from the horizon. The front part of the car is represented as a horizontal rectangular light spot 5 at the lower part of the screen and in the middle of the screen. A photo of a car front may be covered over this light spot. The sky is represented by brightening the upper part of the screen 2.

To (B) For the generation of curves the invention provides that several types of curves and of both turn directions are generated, each of which is produced by one curve function generator 6. Hereby, the curve functions are derived from the shape of the curves and the perspective of a ride in the middle of the road. According to the invention, the light spots are horizontally shiftable with a speed being proportional to the speed of the car, whereby the distances of the two light spots of one pair are not additionally influenced. The shifting of the light spot pairs is achieved by individually shifting via a control voltage $U_{KL}$ every light spot pair horizontally in addition to the normal displacement, according to a specific function. Several standard curves of different shapes and both directions are provided, each of which is generated by a curve function generator 6. According to the invention, these curve function generators are actuated by a curve program generator 7 via curve triggering signals $S_{KT}$ in a way that a non-regular sequence of right and left curves and unequally long straight road sections is produced.

To (C) For alteration of the road picture with track deviations, two steps are provided. For the representation of a car turn relative to the direction of the road, all light spots shall be horizontally shiftable. For the representation of a parallel track displacement relative to the middle of the road, the light spot lines shall be turnable around a horizon intersection point. The curvature of the car track, given by the angle of the steering wheel, has to be kept equal to the curvature of the road. Therefore the invention provides the following that a signal voltage $U_K$ is supplied by the curve function generators which is proportional to the respective road curvature, that an angle signal $W_L$ is supplied by the steering wheel 8 of the simulator, that the two signals are compared with each other in a horizontal shifting device 9, and that the device 9 supplies a voltage $U_H$ for the horizontal shifting of the light spots and a voltage $U_S$ for the alteration of the gradient of the light spot lines, i.e. for turning the picture when the two curvatures are unequal.

For the simulation of drifting the invention provides the following:

that the centrifugal acceleration $b_F$ is measured as the product of speed V times steering wheel angle $W_L$ and compared with an adjustable threshold, and that the track of the car deviates from the line aimed at by the steering wheel if the threshold is surpassed. According to the invention this deviation shall be achieved by influencing the control voltage $U_H$ or by limiting the voltage which is supplied by the steering wheel.

For the representation of the influence of the acceleration on the drifting, the invention provides that the threshold of the centrifugal acceleration is made dependent upon the measured size b of the acceleration.

To (D) Extending and improving known proposals, the invention provides a simulation circuit supplying not only the speed signal but also the engine rotation signal when the clutch is gripping or not gripping.

To (E) To emphasize the impression of a real car ride and to supply to the driver additional information about the dynamic situation of the simulated car during a fast ride, the invention provides that the most relevant noises are simulated and generated by oscillators, namely, the engine noise relative to rotation and the noise of drifting tires.

To (F) Should the driver fail to properly handle the simulator by awkwardly steering or driving too fast into the curves so that the light spot for the front part of the car touches one of the light spots for the road borders, the invention provides that an error measuring signal $S_{FeM}$ is generated. This signal may actuate various processes, e.g. that an error noise is initiated so that the speed is reduced, and that the light spot lines are reset in the middle of the screen. For this purpose the invention provides a monostable multivibrator 21 via which the error measuring signal $S_{FeM}$ is processed into an error triggering signal $S_{Fe}$ of definite duration during which the above mentioned processes occur. Furthermore, an error counter may be provided which supplies a stop signal $S_{AF}$ which ends the program after a set total of errors is achieved.

To (G) To be able to evaluate the skill of the driver, a distance program generator 23 is provided which is to be started by a start signal $S_E$ via a push button or a coin test or acceptor means 24 which first resets the curve program in its initial state and which supplies a stop signal $S_{AS}$ after a certain distance is achieved which is defined by a certain number of light spot sequence periods; also provided is a clock 25 for measuring the driving time, which is started by the start signal $S_E$ and stopped by the stop signal $S_{AS}$. Furthermore, the invention provides that a curve trigger blocking signal $S_{KTS}$ is supplied by the distance program generator. Accordingly, all curves are suppressed e.g. at the end of the distance for representation of a home stretch. The invention provides that the distance is not totally passed with slow riding, but that a stop signal $S_{AU}$ is supplied by the clock after a definite time period is run out, which in fact ends the ride. After the end of the ride, it is provided that the speed is reduced to zero or to a minimum value by the stop signal $S_{AS}$, and the light spot lines are reset to the middle of the screen. Resetting of the clock to zero is achieved by the start signal $S_E$ or the stop signal $S_{AF}$ (FIG. 1).

To (A) The device A for the generation of the road picture described above for introduction is specifically characterized such:

that a video signal generator 30 is provided for the representation of the sky 2, by which a video signal $S_{Hi}$ is generated, that a video signal generator 29 is provided for the representation of the car front, by which a video signal $S_{Wa}$ is generated, that one video signal generator 28 is provided for the representation of two road border posts 3, by which a video signal $S_L$ is generated, several video signal generators 28 being provided, that all video signals are added in a known way in an OR-gate and supplied to a monitor 1, that the video signal generators 28 are supplied by a control voltage $U_H$ for the common horizontal shifting of the light spots, that the individual video signal generators 28 are supplied by the periodical voltage $U_A$ for the vertical deflection and the longitudinal and lateral size alteration of the light spots, by the voltage $U_{Al}$ for the horizontal deflection of the left light spot, by the voltage $U_{Ar}$ for the horizontal deflection of the right light spot, by the digital signal $S_R$ for the darkening of the return movement of the light spot pair, and by a number of voltages $U_{KL}$ for the horizontal shifting of the light spot pair at curves, and that a deflection voltage generator 31 is provided to which the speed signal V and the control voltage $U_S$ for the alteration of the gradient of the light spot lines are supplied.

For measuring of errors, AND-gates 32 are provided to each of which a video signal $S_L$ and a video signal $S_{Wa}$ are supplied, and the outputs of which are supplied to an OR-gate 27 which supplies an error measuring signal $S_{FeM}$ if one of the video signals $S_L$ occurs simultaneously with the video signal $S_{Wa}$ (FIG. 2).

Devices for the generation and alteration of a video signal are known. They comprise a horizontal synchronous pulse generator 35 and a vertical synchronous pulse generator 37, the output signals $S_{HS}$ and $S_{VS}$ of which are delayed in delaying circuits 34 and extended in extension circuits 36 and combined in an AND-gate 32 to the video signal $S_L$. The inventive video signal generator 28 differs from the known video signal generators by the specific performance as a twin spot generator and the specific control voltage supply. It is characterized such, that the horizontal pulse voltages $S_{Hl}$ und $S_{Hr}$ for the left and the right light spot are generated by one pulse generator 35 and combined in an OR-gate 27 to the horizontal twin pulse voltage $S_H$, that a signal $S_R$ inverted in an inverter 33 for the darkening of the back movement is additionally supplied to the AND-gate 32, that the extension of the two horizontal pulses and the extension and the delay of the vertical pulse are controlled by the common deflection voltage $U_A$, that the delay of the right horizontal pulse is controlled by the sum of the signal voltages $U_H$, $U_{KL}$, and $U_{Ar}$, and that the delay of the left horizontal pulse is controlled by the sum of the signal voltages $U_H$, $U_{KL}$, and the voltage $U_{Al}$ inverted in a polarity inverter 38 (FIG. 3).

The device 31 for the generation of the deflection voltages for the video signal generators described above for introduction meets the object to move the light spots in such a way across the screen that the observer gets the impression of a third dimension and of moving right into the picture. According to the invention the deflection is linear within one road section, i.e. while passing between two light spot pairs. The representation of the border posts near the horizon is waived. The consequence is a limited view distance and a limited number of light spot pairs appearing simultaneously in the picture. Every light spot pair runs through the picture from top to bottom according to a time function being composed of linear sections down to the bottom of the picture and returns darkened during one section into the upper initial position. This process repeats periodically. Thus, always one of the provided light spot pairs is darkened and returning.

The device of the deflection voltage generator is specifically characterized thus, that a saw tooth generator 39 is provided and the frequency thereof is controlled by the speed signal V, that a triggering device 40 is provided by which the saw tooth voltage $U_{Sae}$ is converted into a digital periodical signal $S_{PA}$ by which the distance of the light spot pairs is defined, that a light spot sequence counter 41 is provided which supplies a periodical signal $S_{PF}$ after all light spot pairs have run through the picture, the intermediate outputs of counter 41 being supplied to a road section generator 42 supplying current switching signals $S_S$ by which discrete road sections are defined, that an electronic switch 43 for each section is provided by which the pertaining speed signal V is supplied to a polarity inverter 38 during the section concerned, that the switched speed signals, inverted and not inverted, are fed to a valuation matrice 44 via which, for each light spot pair, an integrator charged and discharged in a way that is generates a periodical deflection voltage according to the driving simulation, being nonlinear and composed of linear sections, that a further matrice is provided, equalling said matrice 44, by which in a similar way a deflection voltage $U_{Ar}$ is generated, the size of which is however influenced by the control voltage $U_S$ in addition to the speed signal, that a further matrice is provided, equalling said matrice 44, by which in a similar way the deflection voltage $U_{Al}$ is generated, the size of which is influenced subtractively by the control voltage $U_S$ in addition to the speed signal, and that the switching signals $S_S$ of the individual sections are supplied to the video signal generators 28 in a way that the last section of its periodical sequence is darkened (FIG. 4).

To (B) The device 6 for the generation of curve functions described above for introductory purposes meets the object to deflect the individual light spot pairs in a way that the observer has the impression of the curve being traversed by driving the car in the middle of the road. According to the invention, this deflection occurs linearly during one section of the curve, i.e. during one section of the road. The length of the total curve function is composed of the first section simulating the straight approach of the car to the beginning of the curve and the second section simulating the driving in the curve. Thus, the total length of the curve function is longer than the view distance and may be a multiple of the view distance. That means, it is composed of at least two partial functions each of which beginning at zero, ascending to a certain value during the darkened section, and leading to zero again according to an appropriate function. Specific curves are simulated which are composed of three sections: a clotoide, a circle arc, and a secnd clotoide. Thus, the curvature first ascends linearly, then stays constant, and then descends linearly to zero. According to the invention these three sections are integer multiples of the road sections.

According to the invention, the curve function generator 6 is characterized thus, that a curve section counter 46 is provided which is supplied by the periodical light spot distance signal $S_{PA}$ and actuated by a curve triggering signal $S_{KT}$ in the case of no curve trigger blocking signal $S_{KTS}$ being supplied, and the intermediate outputs of which are supplied to a curve section generator 47 which supplies one sequence of switching signals $S_S$ after each actuation, by which curve sections are determined, that an electronical switch 43 is provided for every section, by which the speed signal V is supplied to a polarity inverter 38 during the concerned section, and that the switched speed signals, inverted and not inverted, are fed to an evaluation matrice 48 via which an integrator 45 for every light spot pair is charged and discharged in a way that it generates a control voltage $U_{KL}$ according to the shape of the curve, being non-linear and composed of linear sections for the horizontal shifting of the light spot pair, and via which an additional integrator 45 is charged and discharged in a way that generates a signal voltage $U_K$ proportional to the curvature of the road (FIG. 5).

The device 7 for the generation of a curve sequence program generator described above for introductory purposes is specifically characterized thus, that one or several curve sequence counters 49 for each type of curve are provided, which are supplied by the periodical light spot sequence signal $S_{PF}$, by which different integers are periodically counted defining the distance of the curves, which count only when they are set in operation by the inverted stop signal $S_{AS}$, and the intermediate output signals of which are supplied to curve sequence section generators 50 which supply curve sequence section signals $S_{KF}$ lasting a period of one light spot sequence, that all curve sequence section signals of one type of curve are added in an OR-gate 27, and that the output of the OR-gate, combined with a curve synchronous signal $S_{KS}$ being supplied by the deflection voltage generator 31 is supplied to an AND-gate 32, the output of which is the curve triggering signal $S_{KT}$ (FIG. 6).

To (C) The device for the horizontal shifting of the light spots described above for introduction meets the object to alter the road picture in the event of turning and parallel shifting of the car. If the curvature of the car track being controlled by the steering wheel does not agree with the curvature of the road being supplied by the curve function generator, a picture shifting shall be achieved first, which is dependent on the deviation according to an integral time function and which is a transformation of the turning of the car relative to the axis of the road. Depending on the ratio of the car length to the road width, also a picture turning shall be achieved simultaneously. According to the invention, the ratio between the turning and the shifting of the picture shall be adjustable. An additional adjustable turning of the picture, which is a transformation of the parallel car shifting, shall be dependent on the picture shifting according to a second integral time function. In order to represent the drifting of the car, the curvature of the car track shall be limited at high centrifugal acceleration. To display the drifted also optically, the invention provides furthermore that an alternating voltage of appropriate amplitude and slow frequency is superimposed as to the direct voltage limiting the centrifugal acceleration.

The device for the horizontal shifting of the light spots is specifically characterized thus, that two multiplying devices 51 are provided by which the steering wheel angle $W_L$ and the voltage $U_K$ proportional to the curvature of the road are multiplied with the speed signal V, that a limiting device 53 is provided by which the product $W_L \cdot V$ is limited for both polarities, that the output of the limiting device and the product $U_k \cdot V$ are subtracted in a subtracting device 20, that the difference is supplied to an integrator 61, that the output of the integrator first delivers the control voltage $U_H$ for the common light spot shifting and secondary is supplied to a second multiplying device 51, that the output of this multiplying device is supplied to an integrator 62, that the output of this integrator delivers the control voltage $U_S$ for the alteration of the gradient of the light spot lines, that evaluation devices 52 and adding devices 20 are provided by which said signals are added and balanced, that the integrators are discharged by a digital signal which is the output of an OR-gate 27 having as inputs the stop signal $S_{AS}$ and the error signal $S_{Fe}$, that the limit of the limiting device 53 is controlled by an adjustable signal $b_{F\,Grenz}$ to which moreover the evaluated signal $b$ of the acceleration and an alternating voltage is added, that the product $b_F$ of the steering wheel angle $W_L$ and the speed signal V is supplied via a rectifier 55 to a threshold device 54, the threshold of which is supplied by the sum of the centrifugal acceleration limit $b_{F\,Grenz}$ and the evaluated acceleration signal $b$, and that the excessive centrifugal acceleration $b_{F\,exz}$ is used as an output signal (FIG. 7).

The device for the horizontal shifting described above is not the only possible one to be considered. The advantage is just that the multiplication of the steering wheel angle by the speed signal can simply be achieved by supplying the speed signal to an adjustable resistor controlled by the steering wheel. Using this method an electronic or electrical multiplying device is not necessary.

Another simplification is provided whereby the multiplying device 51 multiplying the speed signal V and the signal $U_K$ for the curvature of the road is waived by feeding into the integrator not the speed signal V but the square $V^2$. Using this method, the changes in speed occuring during a curve have to be taken into account. A device meeting this object is characterized thus, that a squaring circuit 68 is provided by which the speed signal V is squared, that for each type of curve, a curve section generator 47 is provided supplying the two parts of the curve where the curvature is changing, that an electronic switch 43 is provided for each part of the curve, via which the squared speed signal is supplied to an adding device 20 during the period, involved or concerned therewith that the signal $V^2$ is supplied directly to the adding devices during the first period and via a polarity inverter 38 during the second period, that furthermore, the time gradient of the speed signal supplied by differential devices 69 is supplied to the adding devices, that the outputs of the adding devices are fed to integrators 45, and that the outputs of the integrators are added to form signal V · $U_K$ (FIG. 11).

A specific simplification of the circuit can be achieved according to the invention by totally neglecting the turning of the picture. This simplification is characterized by waiving the devices for the generation and the processing of the control voltage $U_S$ and the deflection voltages $U_{Ar}$ and $U_{Al}$ and by using instead the deflection voltage $U_A$ also for the horizontal shifting of the light spots.

To (D) The device 10 for the computation of the speed of the simulated car is partly known. It is designed in a way, that a first grade delay circuit 63 is provided having the steady state amplifying factor defined by the air resistance of the car, the time constant of which is defined by the inertia of the car, and the output of which delivers the speed signal V, that an evaluation circuit 65 is provided by which input voltage thereof is valued according to the gear ratios and the gear defined by signal $S_G$ and the output $U_{An}$ of which is supplied to the input of the delay circuit 63, that a voltage $U_{Gas}$ is supplied from the accelerator pedal to the input of the evaluation circuit 65 via a switch 56 to be opened by the clutch signal $S_{Ku}$, and that furthermore a voltage $U_{Br}$ is supplied by the brake pedal and a constant voltage $U_{Rei}$ represents the frictional forces supplied with negative polarity to the input of the delay circuit 63.

The additional devices acording to the invention are characterized thus, that a constant voltage $U_{AS}$ for the reduction of the speed at the end of the program and in the event of errors is supplied furthermore to the input of the delay circuit 63 with negative polarity via a switch 43, that the switch 43 is closed by the output of an OR-gate, the inputs of which are supplied by the signals $S_{AS}$ and $S_{Fe}$, that a display 57 for the speed is provided, that another delay circuit 64 of first grade is provided; the steady state amplification factor thereof is defined by the damping of the piston stroke movement, the time constant of which is defined by the rotating inertia of the engine, and the output of which is the rotation signal n, that the input of this delay circuit can be switched over by the clutch signal $S_{Ku}$, that a control amplifier 67 is provided subtracting at its input the rotation signal n as actual value and the speed signal reduced by a second evaluation circuit 65 as reference value, that the output of the control amplifier is connected to the input of the delay circuit 64 with a gripping or engagement or a clutch and that the torque m is connected to the input of the delay circuit with an opening or disengagement of a clutch, that several threshold devices 54 are provided with the inputs to which the rotation signal n is supplied and the thresholds of which are adjusted by constant voltages $U_{Kn}$, that the excessive rotation signals supplied by the outputs of the threshold devices are subtracted via evaluation devices 52 from the voltage $U_{Gas}$ supplied by the acceleration pedal, the subtraction being required to reduce the engine torque with increasing rotation, than an interlocking circuit 66 is provided which transmits a signal $S_{Sch}$ supplied by the gear shift 14 only when a signal $S_{Ku}$ is given by the clutch pedal and the output of circuit 66 supplies the signal $S_G$ for the determination of the effective gear, that a differential circuit 58 is provided converting the speed signal into an acceleration signal b which is supplied to a polarity inverter 38 that supplies the deceleration signal v, that a "Schmitt"-trigger 59 with hysteresis is provided relative to which the deceleration signal v is supplied and the thresholds of which are the constant voltages $v_{An}$ and $v_{Ab}$, that a threshold device 54 is provided to which also the deceleration signal v is supplied, the threshold of which is the constant voltage $V_{Ru}$ and the output of which is supplied to an electronic switch 43 actuated by the output signal $S_{Ru}$ of the "Schmitt"-trigger 59, and that the switched excessive deceleration signal is supplied to a control amplifier 60, the output $U_{Ru}$ of which is added to the input of the delay circuit 63 (FIG. 8).

A specific simplification of the circuit for the speed computation is characterized by waiving the clutch pedal and all devices being influenced by the switching signal of the clutch pedal.

To (E) The device E for the generation of the noises is characterized thus, that the computing device for the speed supplies the rotation signal n to an oscillator 15, that the frequency of the oscillator is proportionally influenced by the rotation signal, that the generated oscillation signal $u_M$ is supplied to a sound amplifier 17 with loudspeaker 18 once directly and once via an evaluation device 16 adjusted by the position of the accelerator pedal, that a second oscillator 19 is provided with the output signal $u_D$ thereof composed of partial oscillations and added to the input of the sound amplifier 17 and which is adjustable in volume by the signal $b_{Fexz}$ for excessive centrifugal acceleration and by the signal $S_{Ru}$ for high deceleration, and that a third oscillator 26 is provided with the output signal $u_{Fe}$ thereof also added to the sound amplifier 17 and which is adjustable in volume by the error signal $S_{Fe}$ (FIG. 9).

To (G) The device for the generation of the distance program is characterized thus, that a counter 70 is provided to which the periodical light spot sequence signal $S_{PF}$ is supplied and which is set into operation by the permanent-on signal $S_{ED}$, which supplies a distance end signal $S_{StrE}$ after having counted a definite integer, and the intermediate outputs of which are supplied to a distance generator 71 which supplies the curve trigger blocking signal $S_{KTS}$, that the permanent-on signal is supplied by a feed back circuit 72 which is closed by the start signal $S_E$ and which is opened by the stop signal $S_{AS}$, that an OR-gate 27 is provided which supplies the stop signal $S_{AS}$ and to which the stop signal $S_{AU}$ from the clock, the stop signal $S_{Af}$ from the error counter and the inverted output of the AND-gate combining the permanent-on signal $S_{ED}$ and the inverted distance end signal $S_{StrE}$ are supplied (FIG. 10).

To (H) The device H for the generation of an obstacle is characterized according to the invention thus, that an additonal video signal generator is provided by which the light spot for an obstacle is generated in the middle of one light spot pair and which is controlled by the deflection voltages of this light spot pair, that the deflection lasts only during one period of the light spot sequence, that the obstacle light spot is triggered with irregular distances by a separate obstacle sequence program generator functioning like a curve sequence program generator, and that an obstacle error signal is supplied if the speed exceeds an adjustable minimum value when the obstacle light spot touches the light spot representing the car front.

All functional units of this additional device are shown in the figures already and are explained in the description. An additional figure is therefore waived.

To the figures:

The figures show the signal processing functional units as blocks with input and output signals, the topological connections between signals and blocks, and the directions of the signals. The functioning of the circuits is explained in the description of the driving simulator. The meaning of the device numbers is set forth in the table for devices; the meaning of the signal symbols is set forth in the table for signals.

FIG. 1 is a survey of the driving simulator comprising all known and new devices except those for obstructing the ride. The blocks are shown in detail in the following figures. In the example of FIG. 1 two types of curve are provided, one right curve and one left curve. Therfore, two curve function generators 6, two curved triggering signals $S_{KT}$, two signal voltages $U_K$ proportional to the curvature of the curve, and two groups of control voltages $U_{KL}$ are shown.

FIG. 2 shows the devices for the generation of the road picture which are shown in FIG. 1 as block A. In the example of FIG. 2, five light spot pairs are provided. Therefore, five video signal generators 28 and the pertaining inputs, outputs, and AND-gates are shown in addition to the video signal generators for the sky and the car.

Figure 1:
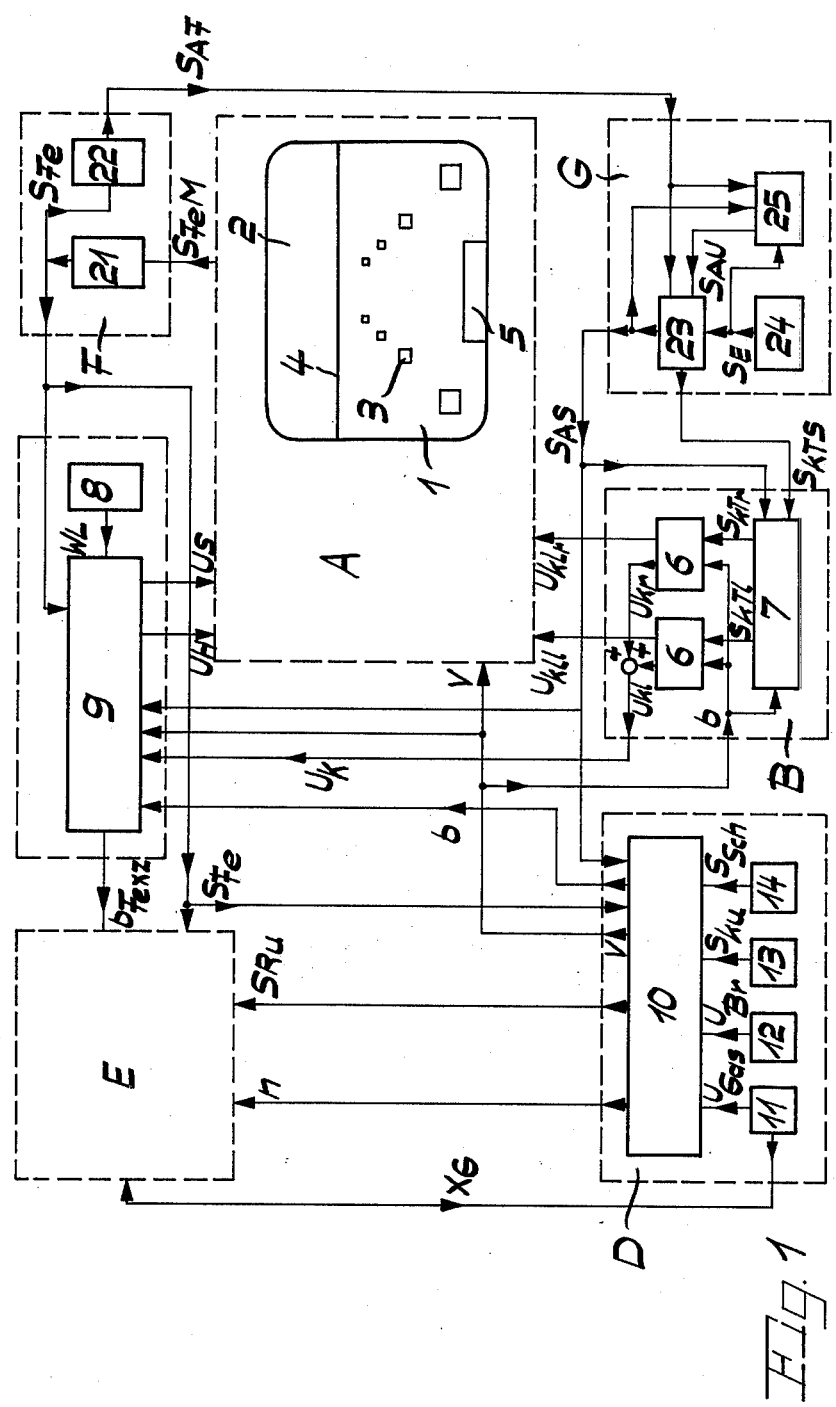
Figure 2:
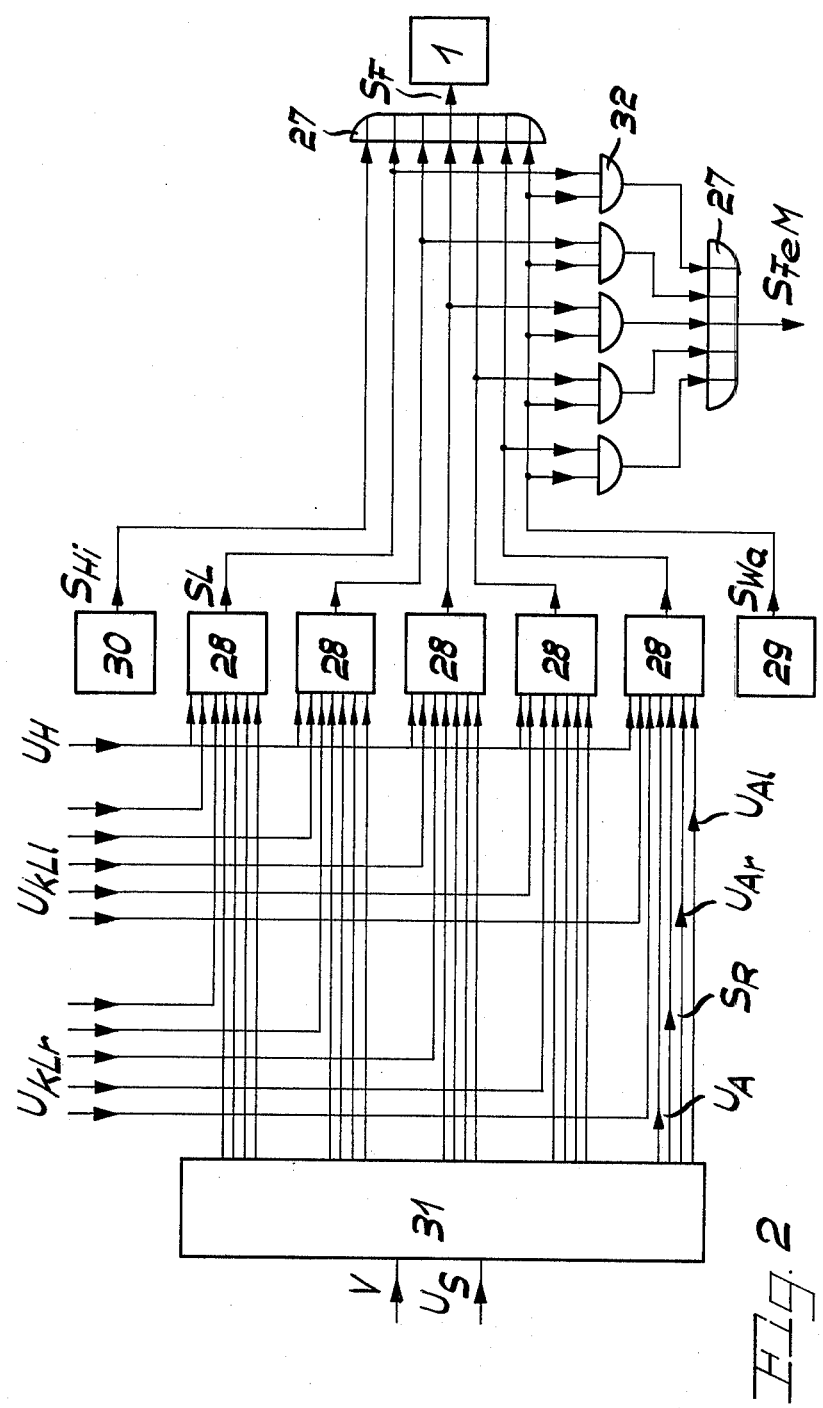
Figure 3:
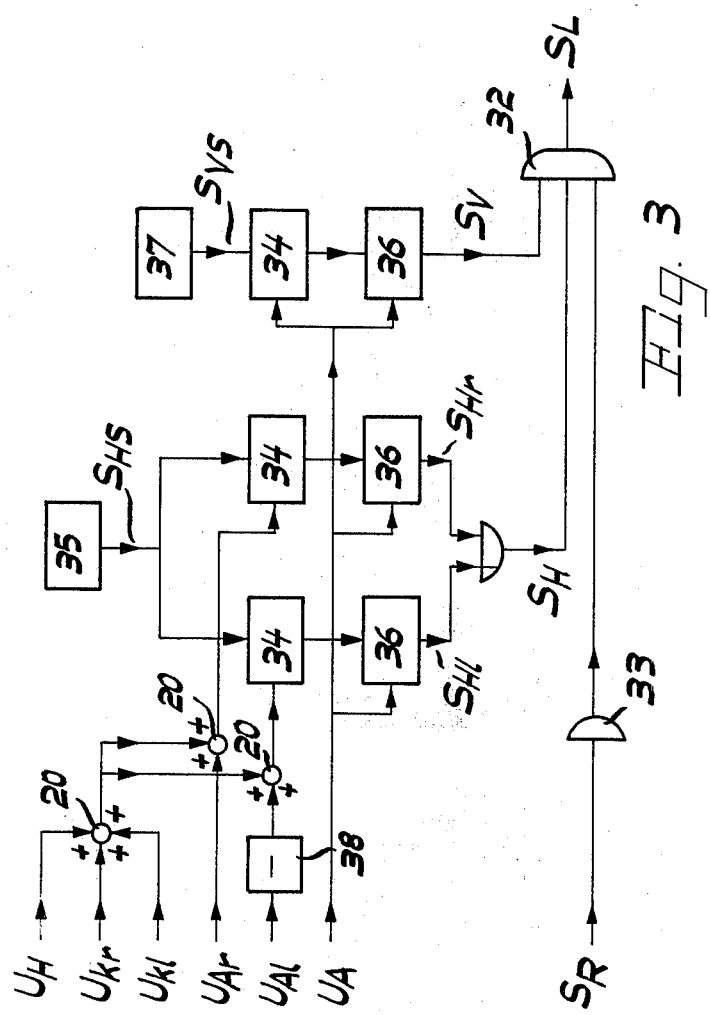
FIG. 3 shows the device for the generation and the alteration of a video signal (video signal generator) for one light spot pair, which is shown in FIG. 2 as block 28.
Figure 4:
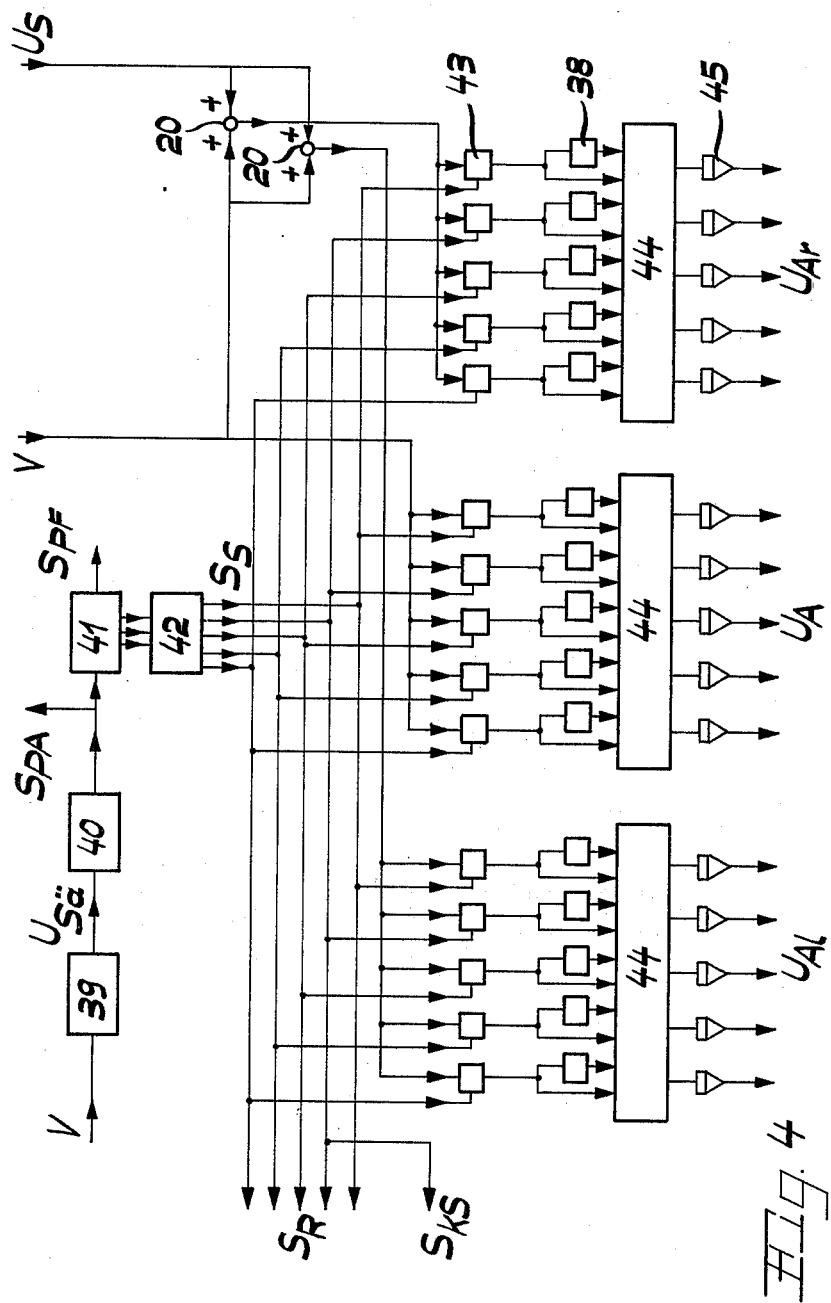
FIG. 4 shows the device for the generation of the deflection voltages (deflection voltage generator), which is shown in FIG. 2 as block 31.
Figure 5:
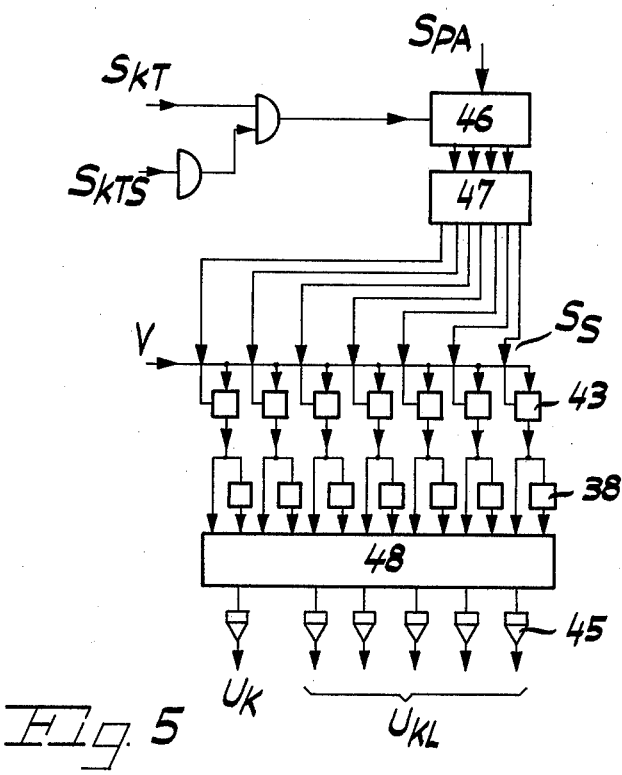

FIG. 5 shows the device for the generation of the curve functions (curve function generator), which is shown in FIG. 1 as block 6. In this example, 7 curve sections and 5 light spot pairs are provided. Therefore, 7 electronic switches 43 with the pertaining polarity inverters 38 and 5 integrators 45 are shown.

Figure 6:
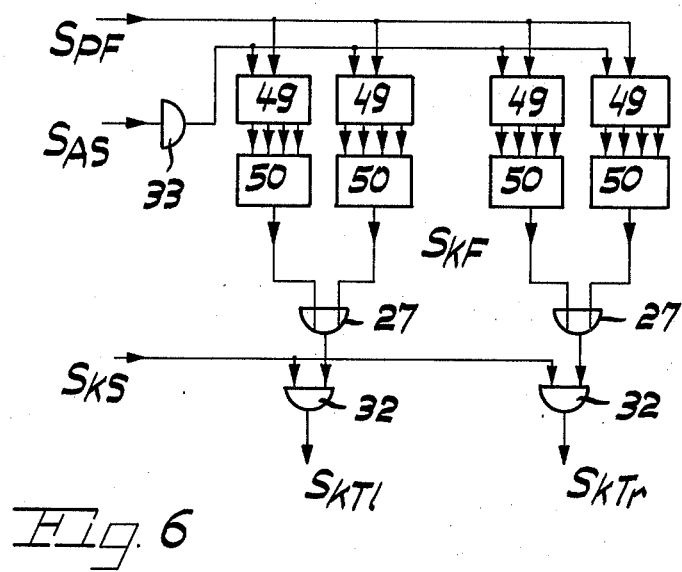

FIG. 6 shows the device for the generation of a curve sequence program (curve sequence program generator) which is shown in FIG. 1 as block 7. In this example, two curves, namely one right curve and one left curve and for either curve two counting sequences are provided. Therefore, two curve triggering signals $S_{KT}$ and four curve sequence counters 49 are shown together with the pertaining curve sequence section generators 50 and their output signals.

Figure 7:
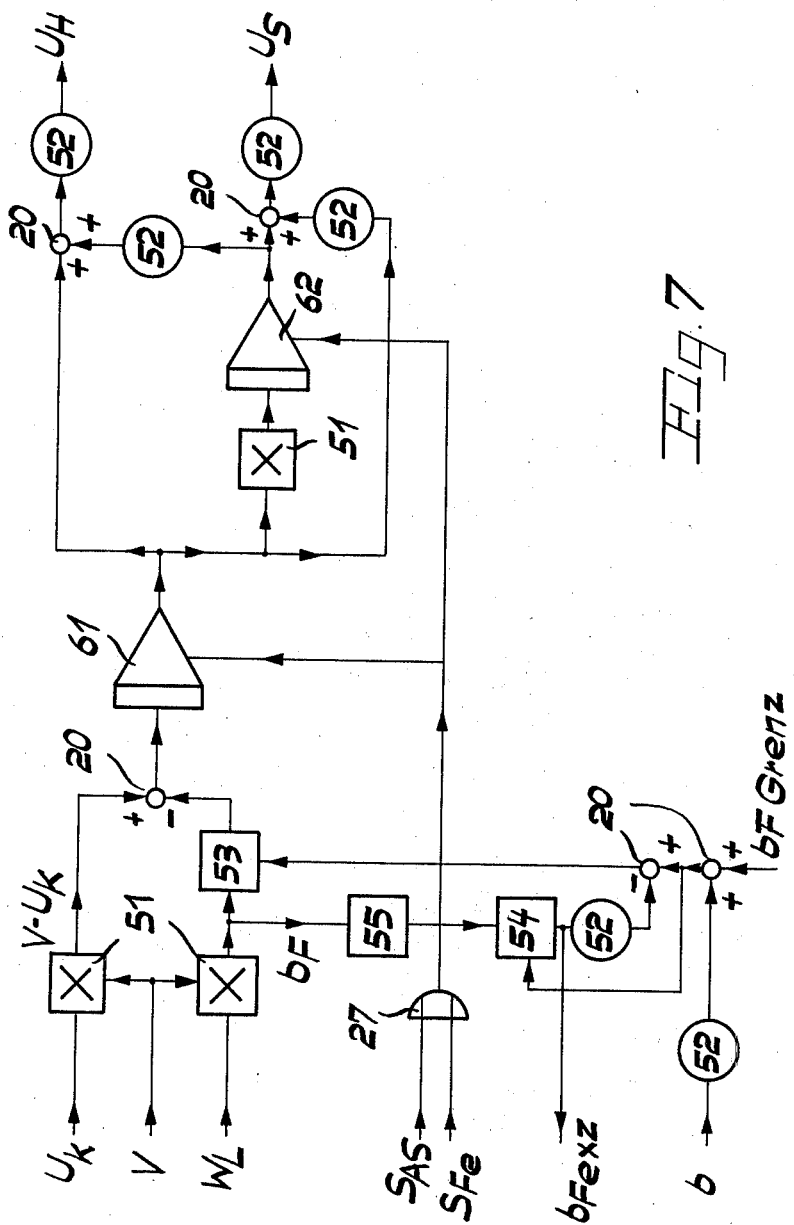

FIG. 7 shows the device for the horizontal shifting of the light spots at deviations of the track of the car, which is shown in FIG. 1 as block 9.

FIG. 8 shows the computing device for the computation of the speed, which is shown in FIG. 1 as block 10.

FIG. 9 shows the devices for the noise generation which is shown in FIG. 1 as block E.

Figure 10:
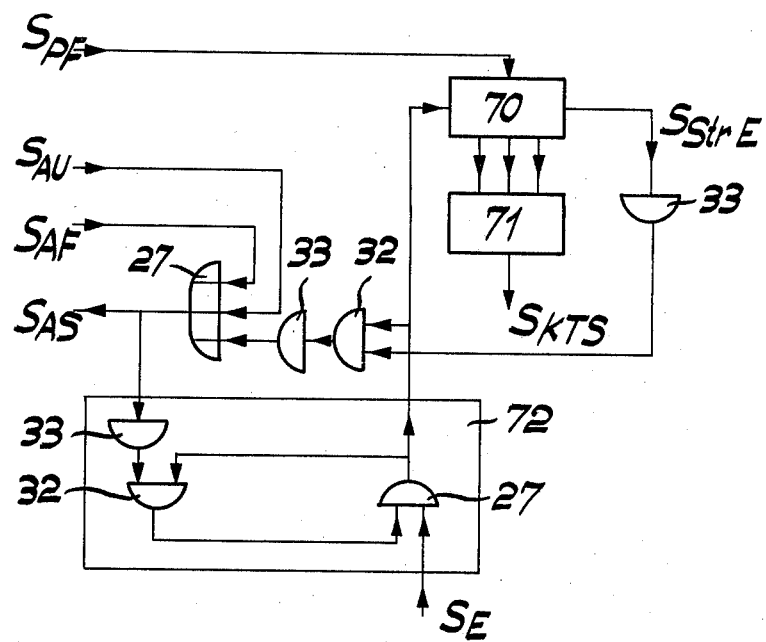

FIG. 10 shows the device for the generation of a distance program (distance program generator), which is shown in FIG. 1 as block 23.

Figure 11:
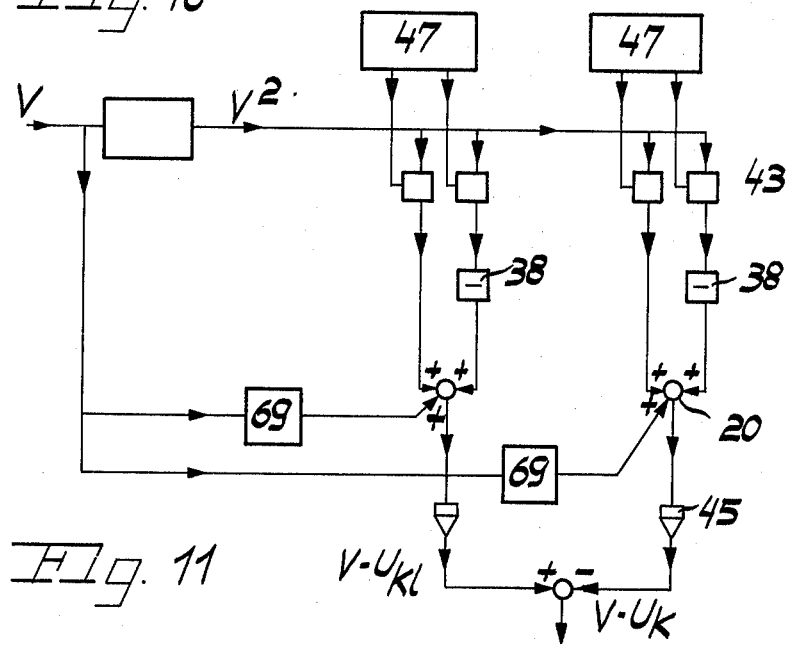

FIG. 11 shows a device for multiplying the speed by the curvature of the road as an alternative to the circuits shown in the FIGS. 5 and 7.

It is, of course, to be understood that the present invention is, by no means, limited to the specific showing in the drawing but also comprises any modifications within the scope of the appended claims.

SIGNALS:

$b$ — Signal voltage for the acceleration of the simulated car $b_F$ — Signal voltage for the centrifugal acceleration $b_{Fexz}$ — Signal voltage for the excessive centrifugal acceleration $b_{FGrenz}$ — limit for the centrifugal acceleration $l$ — subscript for left $m$ — signal voltage for the torque of the simulated engine $n$ — signal voltage for the rotation of the simulated engine $r$ — subscript for right $S$ — general: digital signal voltage $S_{AF}$ — stop signal from the error counter $S_{AS}$ — stop signal $S_{AU}$ — stop signal from the clock $S_E$ — start signal $S_{ED}$ — permanent-on signal $S_F$ — video signal for the generation of all light spots $S_{Fe}$ — error triggering signal $S_{FeM}$ — error measuring signal $S_G$ — signal for the gear in operation $S_H$ — horizontal pulse voltage $S_{Hi}$ — video signal for the generation of the light spot for the sky $S_{HS}$ — horizontal synchronous pulse voltage $S_{KF}$ — curve sequence section signal $S_{KS}$ — curve synchronous signal $S_{KT}$ — curve triggering signal $S_{KTS}$ — curve trigger blocking signal $S_{Ku}$ — switching signal supplied by the cluch pedal $S_L$ — video signal for the generation of a light spot pair $S_P$ — program signal $S_{PA}$ — periodical light spot pair distance signal $S_{PF}$ — periodical light spot sequence signal $S_R$ — darkening signal for the return movement $S_{Ru}$ — signal for sliding under deceleration $S_S$ — switching signal for electronical switches $S_{Sch}$ — signal supplied by the gear shift $S_{StrE}$ — distance end signal $S_V$ — vertical pulse voltage $S_{VS}$ — vertical synchronous pulse voltage $S_{Wa}$ — video signal for the generation of the light spot for the car front $U$ — general: analog signal voltage $u$ — general: alternating voltage $U_A$ — nonlinear periodical deflection voltage $U_{An}$ — control voltage for wheel torque
$U_{AS}$ — constant voltage for the reduction of the speed at the end of the program and at errors
$U_{Br}$ — voltage supplied by the brake pedal
$u_D$ — sound frequency signal for the drifting noise
$U_{Dr}$ — control voltage for the representation of the torque reduction dependent on the rotation
$u_{Fe}$ — sound frequency signal for the error noise
$U_{Gas}$ — control voltage supplied by the accelerator pedal
$U_H$ — control voltage for the common horizontal light spot shifting
$U_K$ — signal voltage being proportional to the curvature of the road
$U_{KL}$ — control voltages for the horizontal shifting of the individual light spot pairs at curves
$U_{Kn}$ — inflexion voltage of the rotation-torque characteristic
$u_M$ — sound frequency signal for the engine noise
$U_{Rei}$ — constant voltage for the representation of the frictional forces
$U_{Ru}$ — control voltage for the control of the sliding deceleration at full braking
$U_S$ — control voltage for the alteration of the gradient of the light spot lines
$U_{Sa}$ — saw tooth voltage
V — speed signal
v — voltage proportional to the deceleration
$v_{An}$ — threshold for increasing voltages of the "Schmitt"-trigger
$v_{Ab}$ — threshold for decreasing voltages of the "Schmitt"-trigger
$v_{Ru}$ — deceleration at sliding
$W_L$ — angle of the steering wheel
$X_G$ — position of the accelerator pedal

DEVICES:

A — devices for the generation of the road picture
B — devices for the generation of curves
C — devices for the alteration of the road picture at track deviations of the simulated car
D — devices influencing the speed
E — devices for the generation of noices
F — devices for the reaction of the simulator at faulty actions of the driver
G — devices for the generation of the distance and for measuring the driving time
H — devices for obstructing the ride
1 — monitor
2 — top part of the screen for representation of the sky
3 — light spots for the representation of embankment posts
4 — horizon
5 — immobile light spot for the representation of the car front
6 — curve function generators
7 — curve sequence program generator
8 — steering wheel
9 — horizontal shifting control device
10 — computing device for speed computation
11 — accelerator pedal
12 — brake pedal
13 — clutch pedal
14 — gear shift
15 — oscillator for the generation of the engine noise
16 — evaluation device
17 — sound frequency amplifier
18 — loudspeaker or earphone
19 — oscillator for the generation of the drifting noise
20 — adding or subtraction device
21 — monostable multivibrator
22 — error counter
23 — distance program generator
24 — push button or coin acceptor
25 — clock
26 — oscillator for the generation of an error noise
27 — OR-gate
28 — video signal generators for light spot pairs
29 — video signal generator for the car front
30 — video signal generator for the sky
31 — deflection voltage generator
32 — AND-gate
33 — inverter for digital signals
34 — pulse delaying circuit
35 — horizontal synchronous pulse generator
36 — pulse extension circuit
37 — vertical synchronous pulse generator
38 — polarity inverter
39 — saw tooth generator
40 — triggering device
41 — light spot sequence counter
42 — road section generator
43 — electronical switch
44 — evaluation matrice for the simulation of the ride
45 — integrators
46 — curve section counter
47 — curve section generator
48 — evaluation matrice for the curve simulation
49 — curve sequence counter
50 — curve sequence section generator
51 — multiplying device
52 — evaluation device
53 — limiting device
54 — threshold device
55 — rectifier
56 — switch
57 — measuring instrument
58 — differentiating device
59 — "Schmitt"-trigger
60 — control amplifier for the control of the sliding deceleration at full braking
61 — integrator for the determination of the track-angle depending on the steering deviation proportional to speed
62 — integrator for the determination of the parallel track shifting dependent on the track-angle porportional to speed
63 — first grade delay circuit according to the inertia of the car
64 — first grade delay circuit according to the centrifugal inertia of the engine
65 — evaluation circuit according to the ratios of three or four gears
66 — interlocking circuit
67 — control amplifier for the control of the rotation derived from the evaluated speed, the clutch gripping
68 — squaring circuit
69 — differentiating circuit
70 — distance program counter
71 — distance section generator
72 — holding circuit

What I claim is:

1. A device for the simulation of a car ride on a plane curved road laterally limited by an enclosure using a monitor for the picture of the road perspectively observed by the driver, the monitor being provided for the generation of the road picture, as well as using control devices such as accelerator pedal, brake pedal, clutch pedal, and steering wheel, and means for providing signals responsive to the various control devices, which devices influence the road picture, as well as using sound generating devices, comprising in combination:

several video signal generators by each of which one phase- and length-controlled vertical pulse and two phase- and length-controlled horizontal pulses for the brightening of one light spot pair are generated, means for generating a speed signal, a deflection voltage generator which is controlled by a speed-proportional pulse generator, which comprises an evaluation matrice having sections, means for switching the evaluation matrice in sections and fed by the speed signal, and which generates periodical voltages being composed of linear time sections for the horizontal and vertical shifting and for the width and height alternation of said light spots, a computing device for the computation of said speed signal, simulating a decreasing rotation - torque characteristic and supplying not only the speed signal but also the signal for the engine rotation, the clutch gripping or not gripping, means for programming a digital curve sequence generator, phase locking means and video signal generators, several standard curve function generators, which generate a sequence of curves on triggering by a digital curve sequence program generator being phase locked to said deflection voltage generator, which curve function generators comprise the same kind of elements and are functioning in principle like said deflection voltage generator, and which supply their output voltages to said video signal generators for the horizontal shifting of said light spot pairs, means connecting curve functional generators to system features, means for determining curvature of road, track angle and parallel track position and the like, a curvature function generator which is controlled by the same signals and comprises the same kind of elements and is functioning in principle like said curve function generators, and which generates an additional voltage being proportional to the curvature of the road, a subtraction device by which said additional voltage is subtracted from a voltage proportional to the angle of the steering wheel, a horizontal shifting control device to which the output of said subtraction device is supplied for influencing the picture according to deviations of the track angle and the parallel track position.

2. A device for the simulation of car ride on a plane curved road laterally limited by an enclosure using a monitor for the picture of the road perspectively observed by the driver, the monitor being provided for the generation of the road picture, as well as using control devices such as accelerator pedal, brake pedal, clutch pedal, and steering wheel, and means for providing signals responsive to the various control devices, which devices influence the road picture, as well as using sound generating devices, comprising in combination:

several video signal generators by each of which one phase- and length-controlled vertical pulse and two phase- and length-controlled horizontal pulses for the brightening of one light spot pair are generated, means for generating a speed signal, a deflection voltage generator which is controlled by a speed-proportional pulse generator, which comprises an evaluation matrice having sections, means for switching the evaluation matrice in sections and fed by the speed signal, and which generates periodical voltages being composed of linear time sections for the horizontal and vertical shifting and for the width and height alteration of said light spots, a computing device for the computation of said speed signal, simulating a decreasing rotation - torque characteristic and supplying not only the speed signal but also the signal for the engine rotation, the clutch gripping or not gripping, means for programming a digital curve sequence generator, phase locking means and video signal generators, several standard curve function generators, which generate a sequence of curves on triggering by a digital curve sequence program generator being phase locked to said deflection voltage generator, which curve function generators comprise the same kind of elements and are functioning in principle like said deflection voltage generator, and which supply their output voltages to said video signal generators for the horizontal shifting of said light spot pairs, means connecting curve functional generators to system features, means for determining curvature of road, track angle and parallel track position and the like, a curvature function generator which is controlled by the same signals and comprises the same kind of elements and is functioning in principle like said curve function generators, and which generates an additional voltage being proportional to the curvature of the road, a subtraction device by which said additional voltage is subtracted from a voltage proportional to the angle of the steering wheel, a horizontal shifting control device to which the output of said subtraction device is supplied for influencing the picture according to deviations of the track angle and the parallel track position, said horizontal shifting control device including:

a multiplying device multiplying the voltage $U_K$, proportional to the curvature of the road, by the speed signal V, a limiting device by which the product of the steering wheel angle $W_L$ and the speed V is limited for both polarities, a subtracting device by which the output of said limiting device is subtracted from the product $U_K V$, the difference being fed to two integrators already known, the outputs of which being the control voltage $U_H$ for the common horizontal shifting of the light spots and the control voltage $U_S$ for the alteration of the gradient of the light spot lines, evaluation device and adding devices by which said said signals are added and balanced, an OR-gate having as inputs the stop signal $S_{AS}$ and the error signal $S_{Fe}$ and discharging said integrators by its output signal, an adding device having as inputs the adjustable signal $b_{FGrenz}$, the evaluated signal b of the acceleration, and an alternating voltage, and controlling the limit of the limiting device by its output, p1 a rectifier to which the product $b_F$ of the steering wheel angle $W_L$ and the speed signal V is supplied, a threshold device the threshold of which is the sum of the centrifugal acceleration limit $b_{FGrenz}$ and the evaluated acceleration signal b, and a further evaluation device the input of which being the output of said threshold device and the output of which being subtracted by a subtraction device from the limit of said limiting device.

3. A device as claimed in claim 2, wherein said horizontal shifting control device includes:

means providing video signals for embankment posts, a video signal generator for the car front generating a video signal $S_{Wa}$, a logical circuit generating an error measuring signal $S_{FeM}$ if one of the video signals for the embankment posts appears simultaneously with said video signal $S_{Wa}$, and a monostable multivibrator supplying an error triggering signal $S_{Fe}$ on actuation by said error measuring signal.

4. A device as claimed in claim 2 wherein each of said video signal generators includes:

an OR gate combining the left and right horizontal pulse voltages, a third inlet at the AND-gate normally used for the combination of the vertical with the horizontal pulses, to which an inverted signal $S_R$ is supplied for the darkening of the light spot return movement, and adding devices by which the sum of the signal voltages $U_H$ for the common horizontal light spot shifting, $U_{KL}$ for the shifting of the light spot pair at curves, $U_{AR}$ for the shifting of the right light spot, and the inverted voltage $U_{Al}$ for the shifting of the left light spot is supplied to the normally used horizontally delaying devices.

5. A device as claimed in claim 2 wherein said deflection voltage generator includes:

a saw tooth generator the frequency of which being controlled by the speed signal V, a triggering device by which said saw tooth voltage $U_{Sae}$ is converted into a digital periodical signal $S_{PA}$ by which the distance of the light spot pairs is defined, a light spot sequence counter which supplies a periodical signal $S_{PF}$ after all light spot pairs having run through the screen, the intermediate outputs of counter being supplied to a road section generator supplying current switching signals $S_S$ by which road sections are defined, an electronical switch for each section, by which the speed signal V is supplied during the section concerned to a polarity inverter, a first evaluation matrice to which said switched speed signals, inverted and not inverted, are supplied, and via which an integrator for each light spot pair is charged and discharged in a way that it generates a periodical deflection voltage according to the driving simulation, being non-linear and being composed of linear sections, a further second evaluation matrice equalling said matrice by which - in a similar way - a deflection voltage $U_{Ar}$ is generated, the size of which is however influenced by the control voltage $U_S$ in addition to the speed signal, screen means, means for providing speed signal, means for determining when all light spot pairs have run through said screen means, means for providing a control voltage $U_S$, and a further third evaluation matrice also equalling said matrice, by way - in a similar way - the deflection voltage $U_{Al}$ is generated, the size of which is influenced subtractively by the control voltage $U_S$ in addition to the speed signal.

6. A device as claimed in claim 2 wherein said curve function generator includes:

means for determining road curvature, means for generating a periodical light spot distance signal $S_{PA}$, means for generating a curve triggering signal $S_{KT}$ and blocking signal, a curve section counter which is supplied by the periodical light spot distance signal $S_{PA}$ and actuated by a curve triggering signal $S_{KT}$ in the event no curve trigger blocking signal $S_{KTS}$ is supplied, and the intermediate outputs of which are supplied to a curve section generator which supplies one sequence of switching signals $S_S$ after each actuation, by which curve sections are determined, means for generating a speed signal V, an electronic switch for every section, by which the speed signal V is supplied to a polarity inverter during the concerned section, an evaluation matrice, to which the switched speed signals, inverted and not inverted, are fed, via which an integrator for each light spot pair is charged and discharged in a way that it generates a control voltage $U_{KL}$ according to the shape of the curve, being non-linear and composed of linear sections for the horizontal shifting of the light spot pair, an additional integrator which is charged and discharged via a part of said matrice in a way that it generates a signal voltage $U_K$ being proportional to the curvature of the road.

7. A device as claimed in claim 2 wherein main curve sequence program generator includes:

at least one curve sequence counter for every type of curve, which are supplied by the periodical light spot sequence signal $S_{PF}$, and by which different integers are periodically counted defining the distance of the curves and counting only when they are set in operation by the inverted stop signal $S_{AS}$, curve sequence section generators to which the intermediate output signals of said curve sequence counters are supplied, and which supply curve sequence section signals $S_{KF}$ lasting for a period of one light spot sequence, an OR-gate by which all curve sequence section signals of one type of curve are added, and an AND-gate the inputs of which are the output signal of said OR-gate and the synchronous signal $S_{KS}$ supplied by the deflection voltage generator, and the output of which AND-gate being the curve triggering signals $S_{KT}$.

8. A device for the generation of noises, according to claim 2, including:

an oscillator to which the rotation signal n is supplied by the computing device for the speed, the frequency of the oscillator being proportional to the rotation signal, an evaluation device, being adjusted by the position for the accelerator pedal, via which the generated oscillation signal $u_M$ for the rotation is supplied to a sound amplifier with loudspeaker, the oscillation signal $U_M$ also being directly supplied to the sound amplifier, a second oscillator the output signal $u_D$ of which is composed of partial oscillations and added to the input of the sound amplifier, and which oscillator is adjustable in volume by the signal $b_{Fexz}$ for excessive centrifugal acceleration and by the signal $S_{Ru}$ for high deceleration, and a third oscillator the output signal $u_{Fe}$ of which is also added to the input of the sound amplifier and which is adjustable in volume by the error signal $S_{Fe}$.

9. A device for the generation of a distance program, according to claim 2, including:

a counter to which the periodical light spot sequence signal $S_{PF}$ is supplied, which is set into operation by the permanent-on signal $S_{ED}$, and which supplies a distance end signal $S_{StrE}$ after having counted a definite integer, a distance section generator to which the intermediate outputs of said counter are supplied and which supplies the curve trigger blocking signal $S_{KTS}$, a feed back circuit which is closed by the start signal $S_E$ and opened by the stop signal $S_{AS}$ and by which said permanent-on signal is supplied, an OR-gate which releases the stop signal $S_{AS}$ and to which the stop signal $S_{AU}$ from the clock, the stop signal $S_{AF}$ from the error counter, and the output of an inverter are supplied, and an AND-gate combining the permanent-on signal $S_{ED}$ and the inverted distance end signal $S_{StrE}$ and which supplies its output signal to said inverter 33.

10. A device for the generation of deflection voltages, according to claim 2, being characterized by:

a simplification which means that the devices for the generation and the processing of the control voltage $U_S$ and of the deflection voltages $U_{Ar}$ and $U_{Al}$ are waived and that the deflection voltage $U_A$ for the horizontal shifting of the light spots is used instead.

11. A device supplying the product of the road-curvature times the speed, according to claim 2, including:

a squaring circuit by which the speed signal V is squared, a curve section generator for each type of curve, supplying the two time periods of the curve where the curvature is changing, electronical switches via which the squared speed signals are supplied to adding devices 20 during the period concerned, polarity inverters via which the signal $V^2$ is supplied to the adding devices during the second period, differential devices supplying the time gradient of the speed signal to the adding devices, and integrators which are fed by the outputs of said adding devices and the outputs of which are added to form signal $VU_K$.

12. A device for the simulation of a car ride on a plane curved road laterally limited by an enclosure using a monitor for the picture of the road perspectively observed by the driver, the monitor being provided for the generation of the road picture, as well as using control devices such as accelerator pedal, brake pedal, clutch pedal, and steering wheel, and means for providing signals responsive to the various control devices, which devices influence the road picture, as well as using sound generating devices, comprising in combination;

several video signal generators by each of which one phase- and length-controlled vertical pulse and two phase- and length-controlled horizontal pulses for the brightening of one light spot pair are generated, means for generating a speed signal, a deflection voltage generator which is controlled by a speed-proportional pulse generator, which comprises an evaluation matrice having sections, means for switching the evaluation matrice in sections and fed by the speed signal, and which generates periodical voltages being composed of linear time sections for the horizontal and vertical shifting and for the width and height alteration of said light spots, a computing device for the computation of said speed signal, simulating a decreasing rotation - torque characteristic and supplying not only the speed signal but also the signal for the engine rotation, the clutch gripping or not gripping, means for programming a digital curve sequence generator, phase locking means and video signal generators, several standard curve function generators, which generate a sequence of curves on triggering by a digital curve sequence program generator being phase locked to said deflection voltage generator, which curve function generators comprise the same kind of elements and are functioning in principle like said deflection voltage generator, and which supply their output voltages to said video signal generators for the horizontal shifting of said light spot pairs, means connecting curve functional generators to system features, means for determining curvature of road, track angle and parallel track position and the like, a curvature function generator which is controlled by the same signals and comprises the same kind of elements and is functioning in principle like said curve function generators, and which generates an additional voltage being proportional to the curvature of the road, a subtraction device by which said additional voltage is subtracted from a voltage proportional to the angle of the steering wheel, a horizontal shifting control device to which the output of said subtraction device is supplied for influencing the picture according to deviations of the track angle and the parallel track position, said computing device for the speed signal including:

a switch via which a constant voltage $U_{AS}$ is supplied to the delay circuit which is already known as a representation of the car inertia, with negative polarity for the reduction of the speed at the end of the program and at errors, an OR-gate the output of which is usd for closing said switch, and the inputs of which are the signals $S_{AS}$ and $S_{Fe}$, a further first-grade delay circuit, the steady state amplification factor of which is defined by the damping of the piston stroke movement, the time constant of which is defined by the rotating inertia of the engine, and the output of which is the rotation signal n, a switch actuated by the clutch signal $K_{KU}$, by which the input of said delay circuit can be switched over, a control amplifier subtracting at its input the rotation signal n as the actual value, and the speed signal, reduced by a second evaluation circuit, as the reference value, the output of the control amplifier being connected to the input of the delay circuit with gripping clutch, and the torque signal m being connected to said delay circuit with opening clutch, several threshold devices to the inputs of which the rotation signal n is supplied and the thresholds of which are provided by constant voltages $U_{Kn}$, evaluation devices the inputs of which are the outputs of said threshold devices and the outputs of which are added by an adding device, a subtracting device by which the output of said adding device is subtracted from the voltage $U_{Gas}$ which is supplied by the acceleration pedal, the subtraction being required to reduce the engine torque with increasing rotation, an interlocking circuit which transmits a signal $S_{Sch}$ supplied by the gear shift only when a signal $S_{Ku}$ is given by the clutch pedal, and the output of which circuit supplies the signal $S_G$ for the determination of the effective gear, a differential circuit converting the speed signal into an acceleration signal $b$ which is supplied to a polarity inverter which supplies the deceleration signal $v$, a "Schmitt" - trigger with hysteresis, to which the deceleration signal $v$ is supplied, and the thresholds of which are the constant voltages $v_{An}$ and $v_{Ab}$, a threshold device to which also the deceleration signal $v$ is supplied, the threshold of which is the constant voltage $v_{Ru}$, and the output of which is supplied to an electronic switch being actuated by the output signal $S_{Ru}$ of said "Schmitt" - trigger, and a control amplifier to which the switched excessive deceleration signal is supplied and the output $U_{Ru}$ of which is added to the input of said known delay circuit.

13. A device for the computation of the speed, according to claim 12, characterized thereby:
that the clutch pedal and all devices which are influenced by the signal of the clutch pedal are waived.

14. A device for the generation of an obstacle including in combination means to generate one light spot and deflection voltage means, means for generating the light spot representing the car front, video signal generator means by which the light spot for an obstacle is generated in the middle of one light spot pair and which is controlled by the deflection voltages of this light spot pair, the deflection lasting only one period of the light spot sequence, an obstacle sequence program generator means releasing the obstacle light spot with irregular distances and functioning like a curve sequence program generator, and an obstacle error measuring device supplying an obstacle error signal provided so that the speed of the car exceeds an adjustable minimum value as soon as the obstacle light spot touches the light spot representing the car front.

* * * * *

UNITED STATES PATENT OFFICE
CERTIFICATE OF CORRECTION

Patent No. 4077138          Dated March 7, 1978

Inventor(s) Reiner Foerst

It is certified that error appears in the above-identified patent and that said Letters Patent are hereby corrected as shown below:

[76] Inventor: Reiner Foerst, Bickenbachstr. 57, 5270 Gummersbach 1, Germany

[30]      Foreign Application Priority Data

May 13, 1975    Germany.......2521110

Signed and Sealed this

*Eleventh* Day of *July 1978*

[SEAL]

*Attest:*

RUTH C. MASON          DONALD W. BANNER
*Attesting Officer*          *Commissioner of Patents and Trademarks*